Sept. 7, 1965

W. S. PARK 3,204,721

TRIANGULATION TOWER

Filed Oct. 23, 1963

INVENTOR.
W. SIDNEY PARK
BY
Albert J. Kramer
ATTORNEY

Sept. 7, 1965
W. S. PARK
3,204,721
TRIANGULATION TOWER
Filed Oct. 23, 1963
4 Sheets-Sheet 2
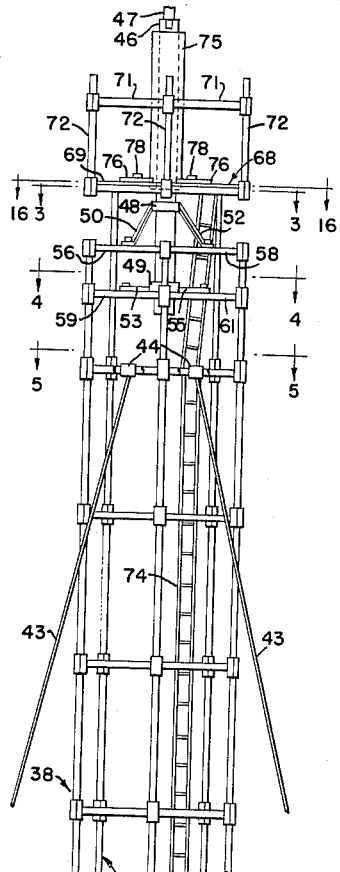
FIG. 1B.
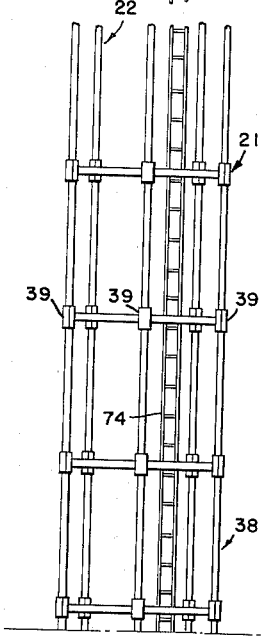
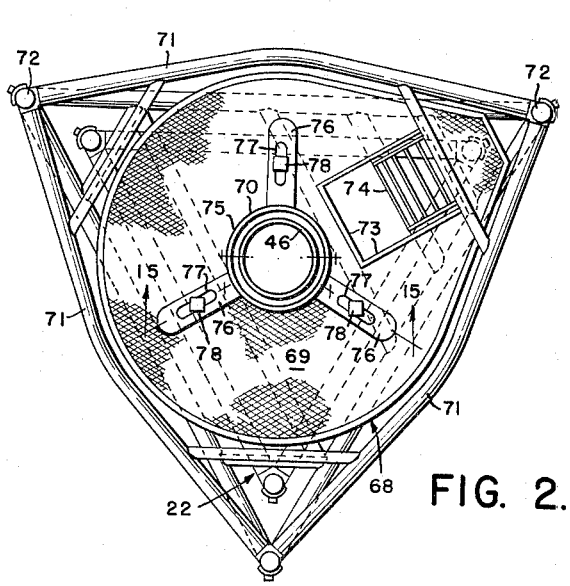
FIG. 2.
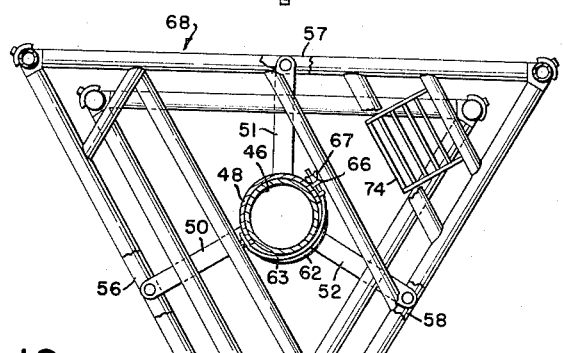
FIG. 3.
FIG. 12.
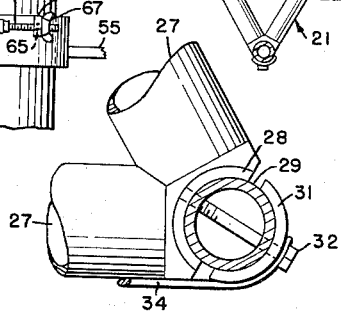
FIG. 7.
INVENTOR
W. SIDNEY PARK
BY Albert J. Kramer
ATTORNEY Sept. 7, 1965     W. S. PARK     3,204,721
TRIANGULATION TOWER Filed Oct. 23, 1963     4 Sheets-Sheet 3

*INVENTOR.*
W. SIDNEY PARK
BY
*Albert J. Kramer*
ATTORNEY

Sept. 7, 1965  W. S. PARK  3,204,721
TRIANGULATION TOWER
Filed Oct. 23, 1963  4 Sheets-Sheet 4

INVENTOR
W. SIDNEY PARK
BY Albert J. Kramer
ATTORNEY

United States Patent Office 3,204,721
Patented Sept. 7, 1965

3,204,721
TRIANGULATION TOWER
Wallace Sidney Park, Standiford Field, Louisville, Ky.
Filed Oct. 23, 1963, Ser. No. 318,314
18 Claims. (Cl. 182—115)

This invention relates to surveying and it is more particularly concerned with towers used as triangulation stations, commonly referred to as triangulation towers.

An object of the invention is the provision of a triangulation tower which can be constructed with greater stability than previously known types of triangulation towers, such as the Bilby towers.

Another object of the invention is the provision of a triangulation tower that is easy to erect, and easy to dismantle and transport from one location to another.

A further object of the invention is the provision of a triangulation tower which has unusual rigidity and stability, and which contains features that make it less hazardous to use.

Prior types of triangulation towers comprise an inner and an outer structure that are mutually independent. Conventionally, the outer structure supports the observer and the inner structure supports the surveying device, which may be either a sighting instrument, such as a transit, or an object to be sighted upon by a sighting instrument at a different station, such as a lighted object. In accordance with this conventional arrangement, the stability of the structure which supports the surveying device is limited by the fact that it is the inner structure and, therefore, its base cannot be larger than if as large as, the outer structure. The structure which supports the personnel handling the surveying devices, need not be as stable as the supporting structure for the surveying devices. It need only be strong enough to support the weight of the persons it is to carry.

The present invention reverses the teachings of the prior art by providing a triangulation tower having an inner and outer structure so arranged that the outer structure, rather than the inner structure, supports the surveying device and the inner structure, rather than the outer structure supports the personnel. By virtue of this reversal, the supporting structure of the surveying devices can be made as large and as stable as desired or as may be required for any degree of accuracy without changing the other structure.

An embodiment of the invention is illustrated in the accompanying drawing and described hereinafter with reference thereto and from which further objects, advantages and features of the invention will be apparent.

In the drawing:

FIGS. 1a and 1b are lower and upper portions, respectively, of an elevational view of an embodiment of the invention, partly broken away.

FIG. 2 is a top plan view of the embodiment.

Figure 1A:
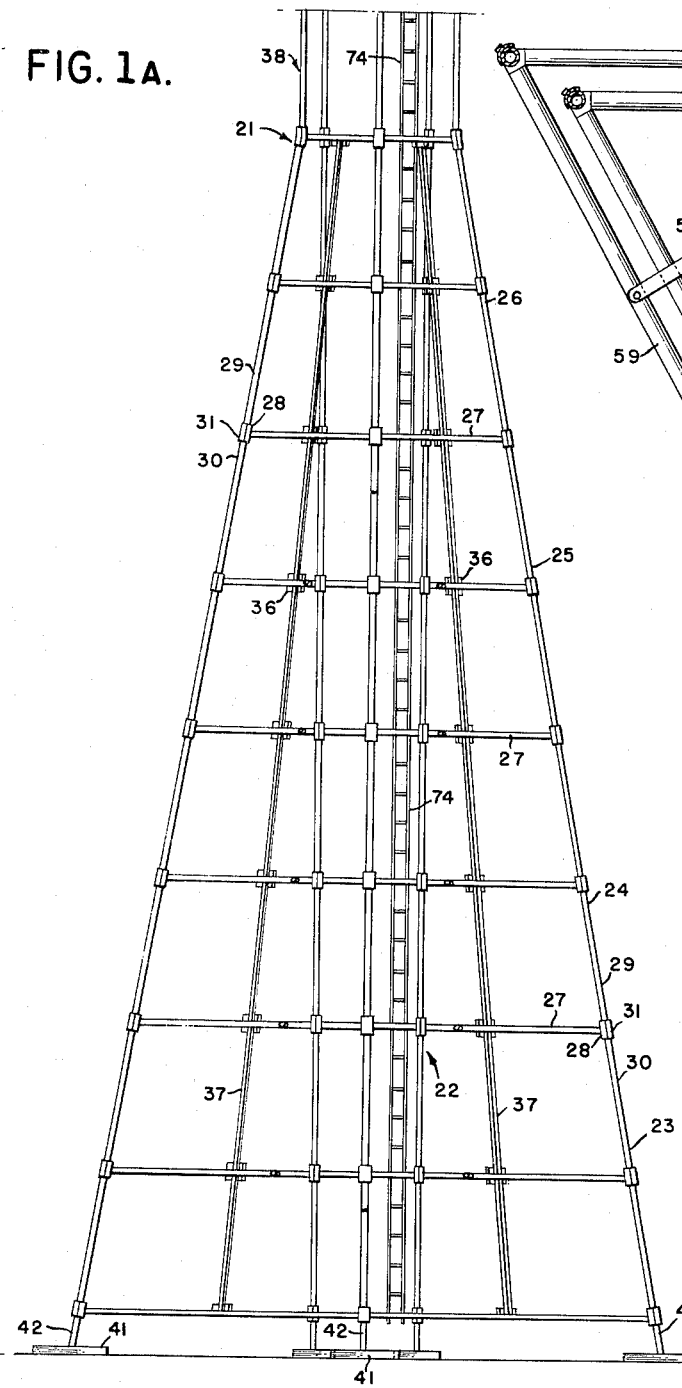
Figure 4:
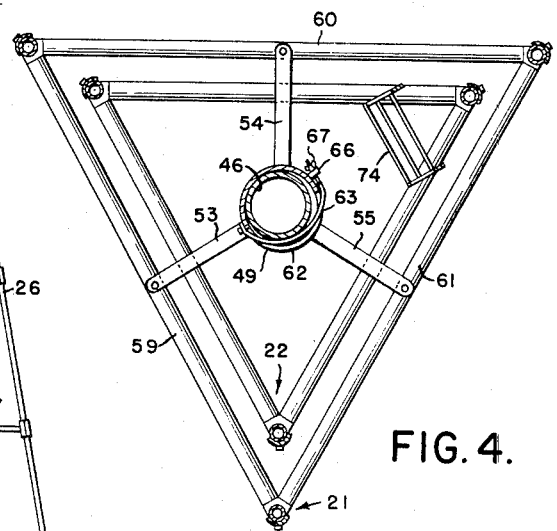
Figure 5:
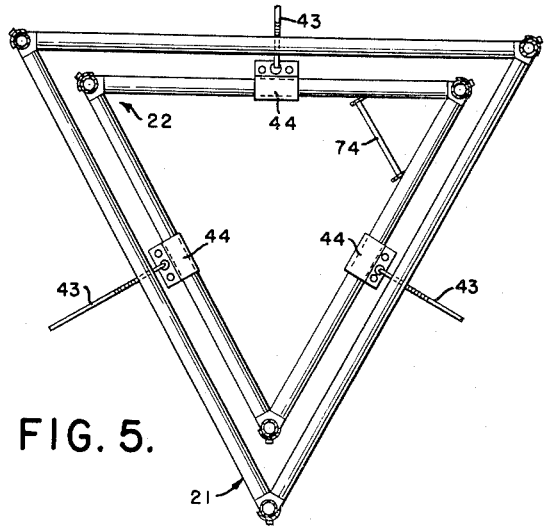

FIGS. 3, 4 and 5 are cross-sectional views along the lines 3—3, 4—4 and 5—5, respectively, of FIG. 1b on an enlarged scale.

Figure 6:
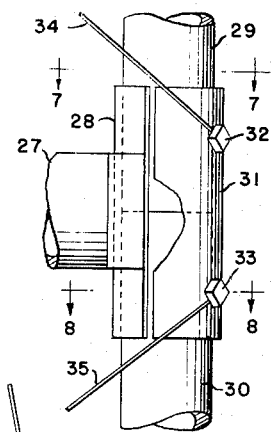

FIG. 6 is a fragmentary view of one of the joints on an enlarged scale.

Figure 8:
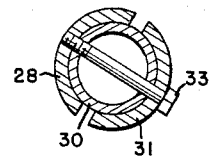

FIGS. 7 and 8 are cross-sectional views along the lines 7—7 and 8—8, respectively, of FIG. 6.

Figure 9:
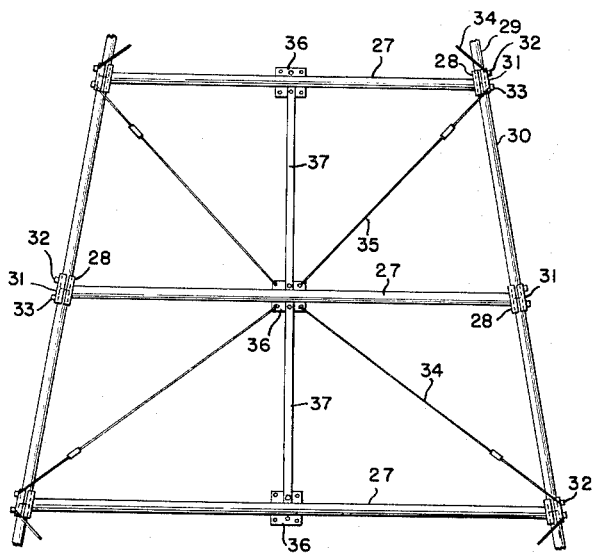

FIG. 9 is an elevational view of one of the frusto-pyramidal base sections of the outer structure.

Figure 10:
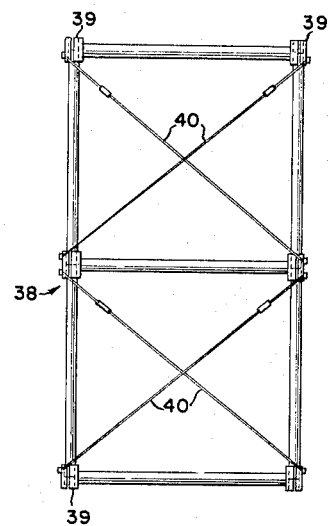

FIG. 10 is an elevational view of one of the prismoidal sections of the inner structure.

Figure 11:
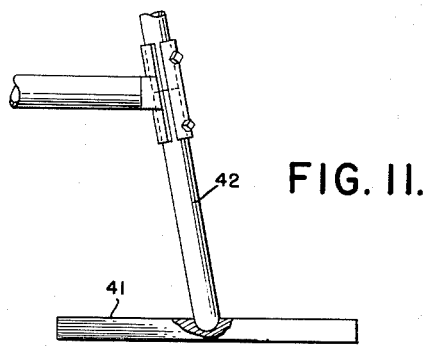

FIG. 11 is a fragmentary view showing the ground supporting means at one leg of the outer structure.

FIG. 12 is an elevational view of one of the clamping devices and fragmentary portion of a pertinent member associated therewith.

Figure 13:
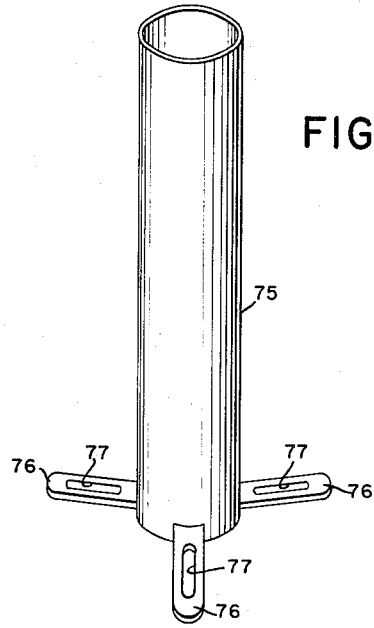

FIG. 13 is a perspective view of the tubular wind shield member apart from the remaining structure.

Figure 14:
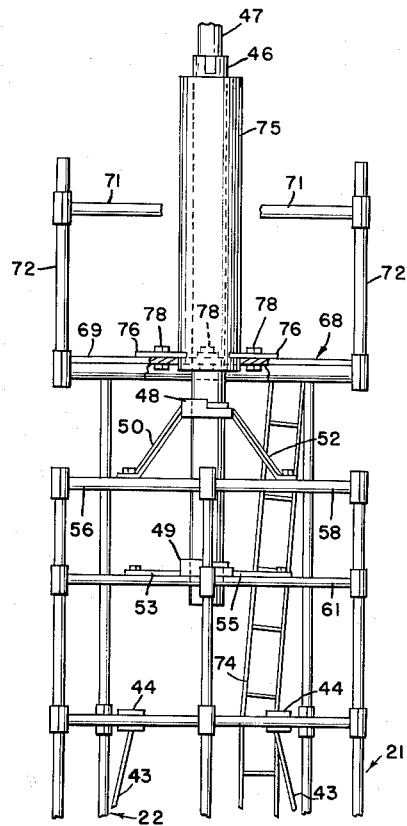

FIG. 14 is an enlarged view of the upper end of FIG. 1b.

Figure 15:
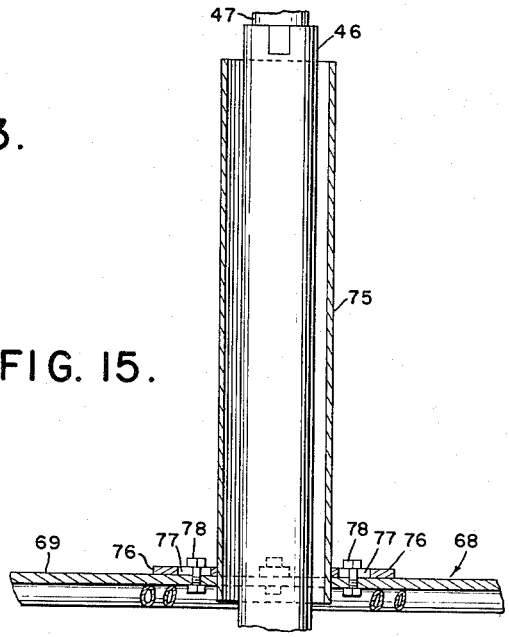

FIG. 15 is a longitudinal sectional view, generally along the line 15—15 of FIG. 2.

Figure 16:
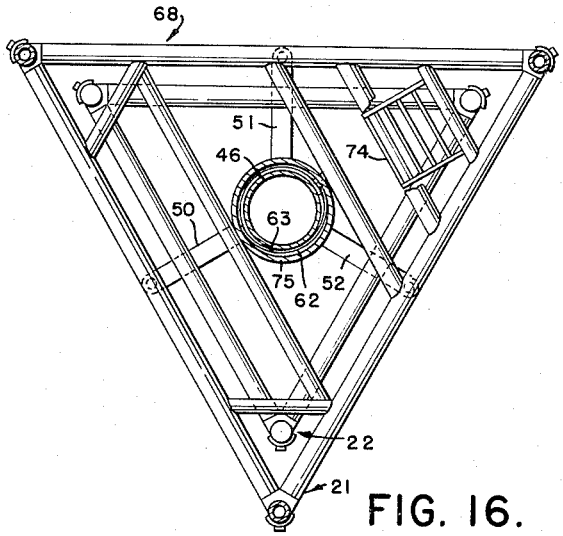

FIG. 16 is a cross-sectional view along the line 16—16 of FIG. 1b.

Referring with more particularity to the drawing in which like numerals designate like parts, the embodiment illustrated comprises a tower having an outer open truss structure 21 and an inner open truss structure 22. The outer structure has a frusto-pyramidal base assembled from one or more frusto-pyramidal sections 23, 24, 25 and 26. These sections are triangular in cross-section and are formed of a plurality of horizontal and vertical tubular bars connected together and braced by diagonal cables or other suitable structural members, as hereinafter more fully explained. Typically, as illustrated in FIGS. 6, 7, 8 and 9, horizontal bars such as bars 27 arranged in the form of a triangle are joined together at their intersecting ends by welding these ends to the inner semi-cylindrical element 28 of a tube clamp. This element of the clamp is disposed on the inner side of the upper and lower ends, respectively, of aligned vertical tube members 29 and 30, respectively. The complementary outer semi-cylindrical element 31 of the tube clamp is disposed against the members 29 and 30 on the sides thereof opposite the element 28. Bolts 32 and 33 pass through apertures in the outer element 31, tube members 29 and 30, and are threadedly engaged with the inner element 28.

By these means, the vertical tube members are removably secured to the horizontal members.

The bracing cables are each attached at one end of a corresponding bolt, such as cables 34 and 35 to bolts 32 and 33, respectively. The opposite end of each cable is attached to a center connector plate, such as the plate 36 (see FIG. 9) welded to the horizontal bars. Additional struts 37 may be welded between successive connector plates to strengthen the structure further, if necessary.

By adding additional sections to the bottom of the base, the ground supporting area of the outer structure is enlarged and hence the stability of the outer structure can be increased without changing the inner structure.

The top of the base is connected to the main superstructure which comprises a series of triangular prismoidal sections 38 (see FIG. 10) connected together by clamps 39 similar to the clamps described above in the base structure. These prismoidal sections are also internally braced by diagonal members 40 extending between the clamp bolts, substantially as shown in FIG. 10.

The inner tower structure is fabricated of prismoidal sections similar to the upper part of the outer structure.

The base of the outer structure is firmly supported on the ground by means of ground plates 41, beneath the leg members 42 as shown in FIG. 11 or by any conventional means known to the art.

The inner structure is secured to the ground by similar or any suitable conventional means and is braced by guy wires 43 extending from clamps 44 secured to the upper part of the inner structure and passing through the open framework of the outer structure to ground anchors or dead men 45 (only one shown).

Within the inner structure, at the top thereof, there is vertically disposed a tube 46 or other suitable or conventional device for receiving and holding a surveying device 47 (fragmentarily shown in FIG. 1b) which may be either a transit or other sighting instrument, or an object, such as a lamp, to be sighted upon from another station.

The tube 46 is adjustably secured in position by two clamping rings 48 and 49 held by two sets of horizontal spider arms, namely, an upper diagonal set 50, 51 and 52 and a horizontal lower set 53, 54 and 55, the inner ends of which are welded to the rings 48 and 49, respectively. These arms pass through the open framework of the inner structure and are firmly secured to structural members of the outer tower structure, such as the members 56, 57 and 58, respectively, on the one hand, and the members 59, 60 and 61, respectively, on the other hand.

The clamping rings are each essentially a tubular section having a portion cut out on one side to provide a diametrical recess 62. This recess is spanned by a flexible band 63. One end of the band is riveted or otherwise secured to the tubular section. The other end of the band is welded or otherwise made integral with a threaded shank 64 which is disposed in an aperture 65 of a block or boss 66 integral with the tubular section. The end of the shank 64 protrudes through the aperture 65 and is provided with a winged nut 67.

To the top of the inner tower structure there is secured a horizontal frame structure 68 above and in spaced relation to the top of the outer structure. On the structure 68 there is rigidly secured by welding or other means a platform 69. The platform has a central opening 70 through which the tube 46 is disposed. The diameter of the opening 70 is larger than that of the tube 46 to a degree which retains the tube in spaced relation out of contact with the platform within the limits of relative flexure between the inner and outer structure.

A railing 71 is secured to the frame structure 68 on stanchions 72 about the platform 69.

In order to gain access to the top of the platform, another opening 73 is provided therethrough between the opening 69 and an edge of the platform, large enough for the passage of a person's body. A ladder 74 extends upwardly through the interior of the inner structure to said opening 73, substantially as shown. This provides a degree of safety for persons using the device in that there is less danger of falling when ascending the interior of a structure due, not only to the adjacency of other surrounding structural members, but also to well known psychological factors.

In actual operation it is found that the force of wind against the instrument holding tube 46 frequently results in its deflection to an extent which adversely affects accuracy of measurements made with the surveying instrument. To prevent this, a tubular shield 75 is disposed about the tube 46 and is provided with radial arms 76 at the bottom extending outwardly adjacent the platform 69. These arms aree provided with longitudinal slots 77 through which bolts 78 are disposed for adjustably and removably securing the arms to the platform as shown.

Having thus described my invention, I claim:

1. A triangulation tower comprising an outer open structure and an inner open structure, said structures being mutually independent, a vertical tubular member carried by the outer structure on the interior of the inner structure, said member being adapted to support a surveying device, and a platform surrounding the tubular member, said platform being secured to the inner structure independently of the outer structure.

2. A triangulation tower comprising an outer structure and an inner structure, said structures being mutually independent, a member within the inner structure for removably supporting a surveying device, means rigidly connecting the member to the outer structure independently of the inner structure, a platform surrounding the member, and means rigidly securing the platform to the inner structure independently of the outer structure.

3. A triangulation tower comprising an outer structure and an inner structure, said structures being mutually independent, a member disposed on the interior of the inner structure for supporting a surveying device, bars rigidly connecting the member to the outer structure independently of the inner structure, a platform adjacent the member, and means rigidly securing the platform to the inner structure independently of the outer structure.

4. A triangulation tower comprising an outer truss structure and an inner truss structure, said structures being mutually independent, a member disposed on the interior of the inner structure for supporting a surveying device, bars passing through the inner truss structure rigidly connecting the member to the outer structure independently of the inner structure, a horizontal platform adjacent the member, and means rigidly securing the platform to the inner structure independently of the outer structure.

5. A triangulation tower comprising bars forming an outer truss structure and an inner truss structure, a member disposed on the interior of the inner structure for supporting a surveying device, bars passing between the bars of the inner truss structure rigidly connecting the member to the outer structure independently of the inner structure, a horizontal platform adjacent the member, and means rigidly securing the platform to the inner structure independently of the outer structure.

6. A triangulation tower comprising an outer truss structure and an inner truss structure, means for securing said structures to the ground independently of each other, a member disposed on the interior of the inner structure for supporting a surveying device, means rigidly connecting the member to the outer structure independently of the inner structure, a horizontal platform adjacent the member, means rigidly securing the platform to the inner structure independently of the outer structure, a ladder on the interior of the inner structure between the bottom thereof and the platform, and means securing the ladder to the inner structure independently of the outer structure.

7. A triangulation tower as defined by claim 6 in which the outer structure comprises a frusto-pyramidal base and a top portion supported on the base, said base comprising a plurality of interconnected frusto-pyramidal sections removably connected together, whereby the area of contact of the base with the ground can be varied by varying the size of the bottommost section of the base.

8. A triangulation tower comprising an outer truss structure and an inner truss structure, said structures being mutually independent, a member disposed on the interior of the inner structure for supporting a surveying device, means passing through the inner truss structure rigidly connecting the member to the outer structure independently of the inner structure, a horizontal platform adjacent to and surrounding the member above the upper end of the outer structure, means rigidly securing the platform to the inner structure independently of the outer structure, and a horizontal railing secured to said platform in spaced relation above it.

9. A triangulation tower comprising an outer truss structure and an inner truss structure, said structures being mutually independent, a horizontal platform secured to the inner structure above and independent of said outer structure, said platform having an aperture therethrough substantially in alignment with the vertical axis of the inner structure, a member vertically disposed in said aperture, said member being adapted to support a surveying device, means passing through the inner truss structure rigidly connecting the member to the outer structure independently of the inner structure.

10. A triangulation tower as defined by claim 9 in which the platform has a second opening therein for the passage of a person's body, and a ladder on the interior of the inner structure extending from said second opening to the bottom of the tower.

11. A triangular tower as defined by claim 1 and clamping rings for releasibly holding the tubular member in different vertical positions.

12. A triangular tower as defined by claim 2 in which the member includes rings surrounding a vertical tube and means for adjustably clamping the rings to the tube.

13. A triangular tower as defined by claim 12 in which the clamping ring comprises a tubular section having a cut out portion on one side, a flexible band spanning said cut out portion, one end of the band being secured to the tubular section and means for releasibly securing the opposite end of the band to the tubular section in different relative positions.

14. A triangulation tower comprising an outer structure and an inner structure, said structures being mutually independent, a member carried by the outer structure independently of the inner structure for removably supporting a surveying device, a platform secured to the inner structure independently of the outer structure adjacent said member, a tubular wind shield surrounding said member, and means rigidly securing the shield to the inner structure.

15. A triangulation tower comprising an outer structure and an inner structure, said structures being mutually independent, a member carried by the outer structure independently of the inner structure for removably supporting a surveying device, a platform secured to the inner structure independently of the outer structure adjacent said member, a tubular wind shield surrounding said member, and means rigidly securing the shield to the platform.

16. A triangulation tower comprising an outer structure and an inner structure, said structure being mutually independent, a member carried by the outer structure independently of the inner structure for removably supporting a surveying device, a platform secured to the inner structure independently of the outer structure adjacent said member, a tubular wind shield surrounding said member, radial arms secured to the shield, and means for securing the arms to the inner structure.

17. A triangulation tower comprising an outer structure and an inner structure, said structures being mutually independent, a member carried by the outer structure independently of the inner structure for removably supporting a surveying device, a platform secured to the inner structure independently of the outer structure adjacent said member, a tubular wind shield surrounding said member, radial arms secured to the shield, and means for securing the arms to the platform.

18. A triangulation tower comprising an outer structure and an inner structure, said structures being mutually independent, a member carried by the outer structure independently of the inner structure for removably supporting a surveying device, a platform secured to the inner structure independently of the outer structure adjacent said member, a tubular wind shield surrounding said member, radial arms secured to the shield, said arms having slots therein, and means passing through said slots for securing the arms to the inner structure.

References Cited by the Examiner
UNITED STATES PATENTS

| | | | |
|---|---|---|---|
| 1,082,207 | 12/13 | Moore | 189—20 |
| 2,857,994 | 10/58 | Sheard | 189—12 |
| 3,118,471 | 1/64 | Turner | 189—12 |
| 3,181,649 | 5/64 | Cutter | 182—179 |

OTHER REFERENCES

The "Principles and Practice of Surveying" vol. II, 6th ed. Breed and Homer, pages 21–24. Photostats dated May 28, 1947, copy in class 189, subclass 12.

HARRISON R. MOSELEY, *Primary Examiner.*